United States Patent
Narimoto et al.

(10) Patent No.: US 10,756,894 B2
(45) Date of Patent: Aug. 25, 2020

(54) VEHICLE COMMUNICATION SYSTEM, ONBOARD APPARATUS, AND KEY ISSUING APPARATUS

(71) Applicant: DENSO CORPORATION, Kariya, Aichi-pref. (JP)

(72) Inventors: Yousuke Narimoto, Kariya (JP); Satoshi Nagao, Kariya (JP); Reiichirou Imoto, Kariya (JP); Takeshi Sugashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 421 days.

(21) Appl. No.: 15/565,705

(22) PCT Filed: Apr. 15, 2016

(86) PCT No.: PCT/JP2016/002062
§ 371 (c)(1),
(2) Date: Oct. 11, 2017

(87) PCT Pub. No.: WO2016/189796
PCT Pub. Date: Dec. 1, 2016

(65) Prior Publication Data
US 2018/0076958 A1    Mar. 15, 2018

(30) Foreign Application Priority Data
May 22, 2015    (JP) .................... 2015-104516

(51) Int. Cl.
*H04L 9/08*    (2006.01)
*H04W 12/04*    (2009.01)
(Continued)

(52) U.S. Cl.
CPC .......... *H04L 9/0877* (2013.01); *H04L 9/0819* (2013.01); *H04L 9/0891* (2013.01);
(Continued)

(58) Field of Classification Search
CPC ....... H04L 9/08; H04L 9/0877; H04L 9/0819; H04L 9/0891; H04L 9/3273; G06F 15/16;
(Continued)

(56) References Cited

U.S. PATENT DOCUMENTS

| | | | | |
|---|---|---|---|---|
| 5,905,434 A | * | 5/1999 | Steffan .................... | B60Q 1/50 116/28 R |
| 7,792,522 B1 | * | 9/2010 | Bussey .............. | G06Q 30/0601 455/418 |
| 9,485,247 B2 | * | 11/2016 | Goudy ................ | H04L 63/0823 |

FOREIGN PATENT DOCUMENTS

| | | |
|---|---|---|
| JP | 2005-045325 A | 2/2005 |
| JP | 2008-291566 A | 12/2008 |

(Continued)

*Primary Examiner* — Thanhnga B Truong
(74) *Attorney, Agent, or Firm* — Posz Law Group, PLC

(57) ABSTRACT

A vehicle communication system includes an onboard apparatus, a mobile device, and a key issuing apparatus provided outside the vehicle for issuing a key for cryptographic communication between the mobile device and the onboard apparatus. The mobile device and the onboard apparatus store the key, and perform the cryptographic communication using the key. The key issuing apparatus issues, to the onboard apparatus, the key and validity information indicating validity of the key. The onboard apparatus includes a determination section determining whether a validity ends, and an update request section transmitting a key update request to request the issuance of a new key. When the key update request has been received, the key issuing apparatus issues a new key to the mobile device, and issues a new key and validity information on the new key to the onboard apparatus.

16 Claims, 3 Drawing Sheets

(51) Int. Cl.
    *H04W 12/02*     (2009.01)
    *H04L 9/32*     (2006.01)
    *H04W 4/48*     (2018.01)
    *H04L 29/08*     (2006.01)
    *H04W 4/40*     (2018.01)

(52) U.S. Cl.
    CPC ........... *H04L 9/3273* (2013.01); *H04W 12/02* (2013.01); *H04W 12/04* (2013.01); *H04L 67/12* (2013.01); *H04L 2209/84* (2013.01); *H04W 4/40* (2018.02); *H04W 4/48* (2018.02)

(58) Field of Classification Search
    CPC ........ G06Q 99/00; H04W 4/00; H04W 76/02; H04W 12/02; H04W 12/04; H04M 1/725
    See application file for complete search history.

(56) References Cited

FOREIGN PATENT DOCUMENTS

| | | |
|---|---|---|
| JP | 2009-275363 A | 11/2009 |
| JP | 2009-302848 A | 12/2009 |
| JP | 2011-256561 A | 12/2011 |
| JP | 2012-038255 A | 2/2012 |
| JP | 2012-049993 A | 3/2012 |

\* cited by examiner

VEHICLE COMMUNICATION SYSTEM, ONBOARD APPARATUS, AND KEY ISSUING APPARATUS

CROSS REFERENCE TO RELATED APPLICATIONS

The present application is a U.S. national stage of International Patent Application No. PCT/JP2016/002062 filed on Apr. 15, 2016 and is based on Japanese Patent Application No. 2015-104516 filed on May 22, 2015, the disclosures of which are incorporated herein by reference.

TECHNICAL FIELD

The present disclosure relates to a vehicle communication system configured to allow cryptographic communication between a mobile device and an onboard apparatus with use of a key issued from a key issuing apparatus.

BACKGROUND ART

Patent Literature 1 discloses a communication system for cryptographic communication between a mobile device carried by a user of a vehicle and an onboard apparatus mounted on the vehicle.

The communication system according to Patent Literature 1 includes the mobile device embodied as a smart key used for locking and unlocking a door, and the onboard apparatus embodied as a door lock device configured to lock and unlock the door. The smart key and the door lock device in the communication system according to Patent Literature 1 store multiple cryptographic communication keys issued from a key issuing apparatus configured to communicate with the smart key and the door lock device via a communication network. Furthermore, the smart key and the door lock device execute cryptographic communication with use of one of the stored keys, and specify a key matched in both of the smart key and the door lock device by switching the used key until succeeding in cryptographic communication. According to Patent Literature 1, the key used for cryptographic communication is updated in accordance with such a method while the smart key and the door lock device do not constantly communicate with the key issuing apparatus, thereby achieving security of the cryptographic communication.

PRIOR ART LITERATURE

Patent Literature

Patent Literature 1: JP 2011-256561 A

SUMMARY OF INVENTION

The technique according to Patent Literature 1 requires the mobile device and the onboard apparatus to store multiple keys. Resource to store the keys may increase. It may thus be difficult to apply this technique to onboard apparatuses and mobile devices having a small resource.

It is an object of the present disclosure to achieve decrease in frequency of communication by a mobile device and an onboard apparatus with a key issuing apparatus, security by means of cryptographic communication key update, and decrease in key storage resource.

A vehicle communication system according to one aspect of the present disclosure includes: an onboard apparatus that is mounted on a vehicle, a mobile device that is carried by a user of the vehicle; and a key issuing apparatus that is provided outside the vehicle and issues a key for cryptographic communication to the mobile device and the onboard apparatus.

In the vehicle communication system, the mobile device and the onboard apparatus store the key issued by the key issuing apparatus and execute the cryptographic communication with use of the key.

The key issuing apparatus issues, to the onboard apparatus, the key and validity information indicating validity of the key.

The onboard apparatus includes a determination section and an update request section. The determination section determines whether the validity indicated by the validity information issued ends. The update request section transmits, to the key issuing apparatus, a key update request to request issuance of a new key when the determination section determines that the validity ends.

The key issuing apparatus issues a new key to the mobile device upon receipt of the key update request, and issues, to the onboard apparatus, the new key and the validity information on the new key (S160, S130 to S150).

The vehicle communication system according to the present disclosure may have the following effects.

The key issuing apparatus has only to issue a key to the mobile device and the onboard apparatus every time validity indicated by validity information ends. It may be possible to decrease frequency in which the mobile device and the onboard apparatus need to communicate with the key issuing apparatus.

Since a key used for cryptographic communication by the mobile device and the onboard apparatus is updated every time validity indicated by validity information ends, it may be possible to achieve security of the cryptographic communication.

The mobile device and the onboard apparatus have only to store a single cryptographic communication key. There is thus no need to store multiple keys. It may be possible to decrease key storage resource (that is, a memory resource) of each of the mobile device and the onboard apparatus.

The mobile device, which may possibly be carried away by a person other than a user of the vehicle, does not store key validity information. With this configuration, it may be possible to prevent a malicious person from manipulating validity information, and to achieve higher security of cryptographic communication.

An onboard apparatus according to another aspect of the present disclosure is mounted on a vehicle and executes cryptographic communication with a mobile device carried by a user of the vehicle, with use of a key for the cryptographic communication issued by a key issuing apparatus provided outside the vehicle.

The key issuing apparatus issues, to the onboard apparatus, the key and validity information indicating validity of the key.

The onboard apparatus includes a determination section and an update request section. The determination section determines whether the validity indicated by the validity information issued ends. The update request section transmits, to the key issuing apparatus, a key update request to request issuance of a new key when the determination section determines that the validity ends.

The onboard apparatus according to the present disclosure may be used as an onboard apparatus in a vehicle communication system.

The key issuing apparatus according to a different mode of the present disclosure issues the cryptographic communication key to the mobile device carried by the user of the vehicle and the onboard apparatus mounted on the vehicle.

A key issuing apparatus includes a first issuance section, a second issuance section, and a key update section. The first issuance section issues the key to the mobile device. The second issuance section issues, to the onboard apparatus, the key and validity information indicating validity of the key. The key update section determines whether the key update section receives a key update request transmitted from the onboard apparatus when the validity indicated by the validity information issued to the onboard apparatus ends, and causes the first issuance section to issue a new key and the second issuance section to issue the key and the validity information on the new key, when the key update section determines receiving the key update request.

The key issuing apparatus according to the present disclosure may be used as a key issuing apparatus in a vehicle communication system.

The present disclosure achieves decrease in frequency of communication by the mobile device and the onboard apparatus with the key issuing apparatus, security by means of cryptographic communication key update, and decrease in key storage resource.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

A vehicle communication system according to an embodiment of the present disclosure will now be described below.

(Configuration)

Figure 1:
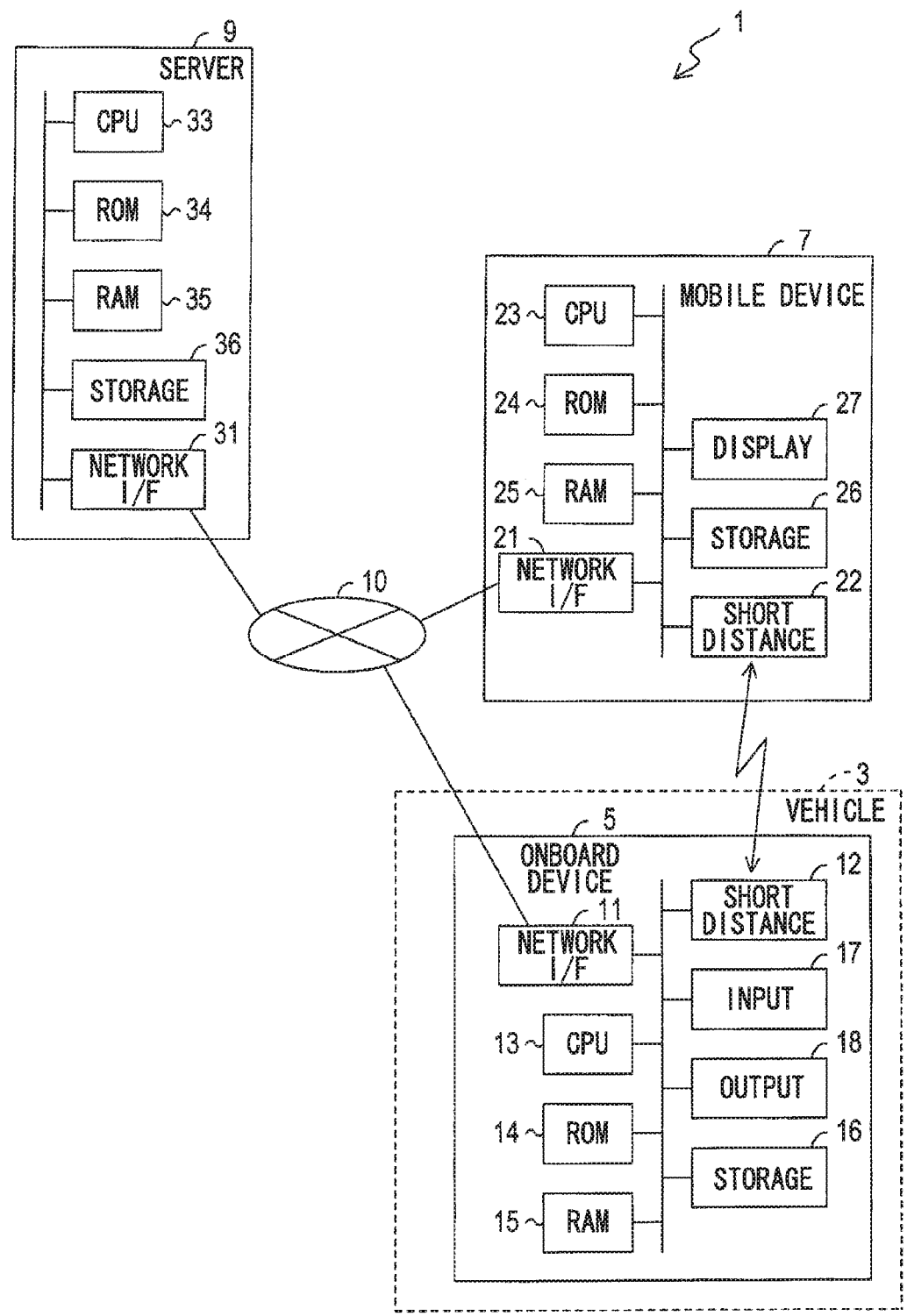
FIG. 1 is a diagram illustrating a vehicle communication system according to an embodiment.

As Illustrated in FIG. 1, a vehicle communication system 1 according to the present embodiment includes an onboard apparatus 5 mounted on a vehicle 3, a mobile device 7 carried by a user of the vehicle 3, and a key issuing server (corresponding to a key issuing apparatus) 9 functioning as a key issuing apparatus provided outside the vehicle 3.

The mobile device 7 according to the present embodiment is a multifunctional mobile phone (a so-called smartphone). The key issuing server 9 functions as a center configured to issue a cryptographic communication key to the onboard apparatus 5 and the mobile device 7.

Communication between the key issuing server 9 and the onboard apparatus 5, and communication between the key issuing server 9 and the mobile device 7 are achieved via a communication network 10 such as a mobile phone network, the Internet, or a wide area network. The onboard apparatus 5 and the mobile device 7 are each configured to wirelessly communicate with the key issuing server 9.

The mobile device 7 and the onboard apparatus 5 are configured to communicate with each other by means of short-range wireless communication in the ultra high frequency (UHF) band or the like. The present embodiment adopts the Bluetooth (registered trademark) or the like as a wireless communication system between the mobile device 7 and the onboard apparatus 5. The present disclosure can alternatively adopt any other system such as infrared data communication. The mobile device 7 and the onboard apparatus 5 can still alternatively communicate with each other via the communication network 10.

The onboard apparatus 5 includes a network interface 11 for communication at least with the key issuing server 9 via the communication network 10, and a short-range communication device 12 configured to wirelessly communicate with the mobile device 7. The onboard apparatus 5 further includes a central processing unit (CPU) 13, a read only memory (ROM) 14, a random access memory (RAM) 15, and a storage device 16. Examples of the storage device 16 include rewritable nonvolatile memories such as an electrically erasable programmable ROM (EEPROM) and a flash memory, as well as a hard disk drive. The onboard apparatus 5 further includes an input circuit 17 configured to input various types of information on the vehicle 3, and an output circuit 18 configured to control instruments mounted on the vehicle 3.

The mobile device 7 includes a network interface 21 for communication at least with the key issuing server 9 via the communication network 10, a short-range communication device 22 configured to wirelessly communicate with the onboard apparatus 5, a CPU 23, a ROM 24, a RAM 25, a storage device 26, and a display device 27. Examples of the display device 27 include a touch panel also functioning as an input device. Examples of the storage device 26 include rewritable nonvolatile memories such as an EEPROM and a flash memory, as well as a hard disk drive.

The key issuing server 9 includes a network interface 31 for communication at least with the onboard apparatus 5 and the mobile device 7 via the communication network 10, a CPU 33, a ROM 34, a RAM 35, and a storage device 36. Example s of the storage device 36 include a hard disk drive as well as rewritable nonvolatile memories such as an EEPROM and a flash memory.

Each of the key issuing server 9, the mobile device 7, and the onboard apparatus 5 includes the CPU, the ROM, and the RAM, and thus functions as a computer.

(Processing)

Processing of each of the key issuing server 9, the mobile device 7, and the onboard apparatus 5 will be described next with reference to FIG. 2 and FIG. 3. Behavior of the key issuing server 9 is actualized by causing the CPU 33 to execute a program stored in the ROM 34, the storage device 36, or the like. The ROM 34 and the storage device 36 exemplify a non-transitory computer readable storage medium. Behavior of the onboard apparatus 5 is actualized by causing the CPU 13 to execute a program stored in the ROM 14, the storage device 16, or the like. Behavior of the mobile device 7 is actualized by causing the CPU 23 to execute a program stored in the ROM 24, the storage device 26, or the like. In particular, the behavior of the mobile device 7 to be described below is actualized by causing the CPU 23 to execute application software stored in the storage device 26 or the like. The application software may be downloaded from the key issuing server 9 or the like.

Figure 2:
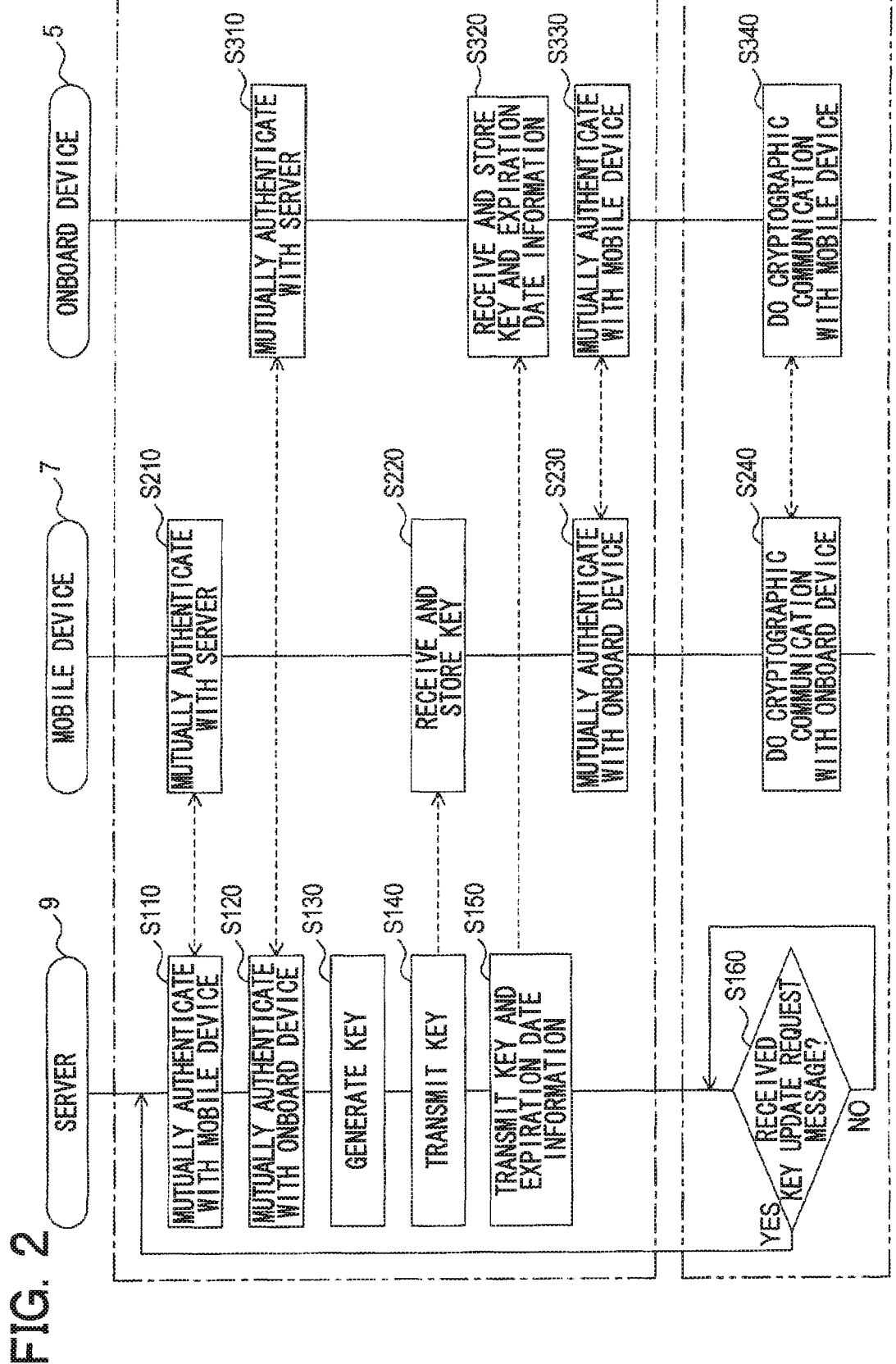
FIG. 2 is a flowchart illustrating respective processing of a key issuing server, a mobile device, and an onboard apparatus.

As illustrated in FIG. 2, the key issuing server 9 executes processing for mutual authentication with the mobile device 7 (S110). The mobile device 7 then also executes processing for mutual authentication with the key issuing server 9 (S210). That is, the key issuing server 9 and the mobile device 7 execute mutual authentication (S110 and S210).

The key issuing server 9 and the mobile device 7 execute mutual authentication in accordance with a challenge response system or the like.

The key issuing server 9 and the mobile device 7 execute mutual authentication with use of an authentication key, which will hereinafter be called an authentication key A. The key issuing server 9 preliminarily delivers the authentication key A to the mobile device 7. For example, the authentication key A can be embedded in the application software downloaded from the key issuing server 9 to the mobile device 7. Alternatively, the key issuing server 9 can be configured to transmit the authentication key A to the mobile device 7 when a user operates the mobile device 7 and transmits a user ID, a password, and the like to the key issuing server 9. The authentication key A can be delivered to the mobile device 7 in accordance with any method as long as the key issuing server 9 and the mobile device 7 can share the authentication key A.

Upon mutual authentication between the key issuing server 9 and the mobile device 7, the key issuing server 9 initially transmits, to the mobile device 7, random data varied every time as a "challenge". The mobile device 7 executes predetermined arithmetic operation with use of the data received from the key issuing server 9 and the authentication key A possessed by the mobile device 7 itself, and transmits, to the key issuing server 9, result data of the arithmetic operation as "a response". The key issuing server 9 executes arithmetic operation same as that of the mobile device 7 with use of the "challenge" transmitted to the mobile device 7 and the authentication key A possessed by the key issuing server 9 itself to obtain a "response". The key issuing server 9 authenticates the mobile device 7 if a result of the arithmetic operation matches the "response" received from the mobile device 7. The mobile device 7 then authenticates the key issuing server 9 with the mobile device 7 as a transmitter of a "challenge" and the key issuing server 9 as a receiver of a "response". The key issuing server 9 and the mobile device 7 can execute mutual authentication in accordance with a system other than the challenge response system.

The key issuing server 9 subsequently executes processing for mutual authentication with the onboard apparatus 5 (S120). The onboard apparatus 5 then also executes processing for mutual authentication with the key issuing server 9 (S310). That is, the key issuing server 9 and the onboard apparatus 5 execute mutual authentication (S120 and S310).

The key issuing server 9 and the onboard apparatus 5 execute mutual authentication in accordance with the challenge response system or the like, similarly to mutual authentication between the key issuing server 9 and the mobile device 7.

The key issuing server 9 and the onboard apparatus 5 execute mutual authentication with use of an authentication key, which will hereinafter be called an authentication key B. The authentication key B is generated from a master key and an ID unique to the onboard apparatus 5 or the like.

Specifically, the master key is shared by a production plant of the vehicle 3 and the key issuing server 9. In a process of producing the vehicle 3 at the production plant of the vehicle 3, the authentication key B is generated from the ID of the onboard apparatus 5 and the master key in accordance with a predetermined generation rule, and the generated authentication key B is written in the storage device 16 or the like of the onboard apparatus 5. The onboard apparatus 5 executes mutual authentication with the key issuing server 9 with use of the authentication key B stored in the storage device 16.

The key issuing server 9 acquires the ID from the onboard apparatus 5 during authentication with the onboard apparatus 5, and generates the authentication key B from the acquired ID and the master key in accordance with a rule similar to the generation rule adopted at the production plant of the vehicle 3. The key issuing server 9 then executes mutual authentication with the onboard apparatus 5 with use of the generated authentication key B.

When the key issuing server 9 completes mutual authentication with the mobile device 7 and the onboard apparatus 5, the key issuing server 9 generates a cryptographic communication key to be issued to the mobile device 7 and the onboard apparatus 5 (S130). The key issuing server 9 issues a different key in S130 each time.

The key issuing server 9 encrypts the key generated in S130 with use of the authentication key A shared with the mobile device 7, and transmits the encrypted key to the mobile device 7 (S140). Transmitting a key to the mobile device 7 corresponds to issuing the key to the mobile device 7.

Meanwhile, the mobile device 7 receives the encrypted key from the key issuing server 9, decrypts the received key with use of the authentication key A, and stores the decrypted key in the storage device 26 or the like (S220).

The key issuing server 9 adds validity information to the key generated in S130, and encrypts the key including the validity information (hereinafter, called a key including information) with use of the authentication key B shared with the onboard apparatus 5. The key issuing server 9 then transmits the encrypted key including the information to the onboard apparatus 5 (S150). Transmitting a key including information to the onboard apparatus 5 corresponds to issuing the key and validity information to the onboard apparatus 5. Validity information indicates validity of a key. Specific contents of such validity information will be described later.

Meanwhile, the onboard apparatus 5 receives the encrypted key including the information from the key issuing server 9, and decrypts the received key including the information with use of the authentication key B. The onboard apparatus 5 then stores the key and the validity information thus decrypted in the storage device 16 or the like (S320). The key issuing server 9 can alternatively transmit, to the onboard apparatus 5, a key and validity information sequentially one by one, instead of transmitting in the form of the key including the information.

The mobile device 7 and the onboard apparatus 5 then execute mutual authentication with use of the key issued from the key issuing server 9 (S230 and S330). Specifically, the mobile device 7 executes processing for mutual authentication with the onboard apparatus 5 in S230, and the onboard apparatus 5 executes processing for mutual authentication with the mobile device 7 in S330.

The mobile device 7 and the onboard apparatus 5 execute mutual authentication in accordance with the challenge response system or the like, with use of a key issued from the key issuing server 9 as an authentication key.

Failure in mutual authentication between the mobile device 7 and the onboard apparatus 5 will be caused by difference between keys stored in the mobile device 7 and the onboard apparatus 5. In this case, processing surrounded with a dashed line in FIG. 2 is executed again. The processing surrounded with the dashed line in FIG. 2 (that is, processing in S110 to S150, S210 to S230, and S310 to S330) brings completion of key delivery from the key issuing server 9 to the mobile device 7 and the onboard apparatus 5. In an exemplary case where one of the mobile device 7 and the onboard apparatus 5 fails in authentication of the other, the one transmits a retry request to the key issuing server 9. The key issuing server 9 repeats the processing from S110 upon receipt of the retry request.

After succeeding in mutual authentication, the mobile device 7 and the onboard apparatus 5 execute cryptographic communication with use of the key issued from the key issuing server 9 and stored (S240 and S340). The mobile device 7 and the onboard apparatus 5 execute cryptographic communication to offer service to a user. Processing surrounded with a two-dot chain line in FIG. 2 is executed upon offering service to a user.

The mobile device 7 encrypts a command indicating contents of a request inputted to the mobile device 7 by a user, with use of the key stored in the storage device 26 in S220, and transmits the encrypted command to the onboard apparatus 5 by means of the short-range communication device 22.

The onboard apparatus 5 receives the command from the mobile device 7 by means of the short-range communication device 12, and decrypts the received command with use of the key stored in the storage device 16 in S320. The onboard apparatus 5 then executes processing according to the decrypted command.

Examples of the command include a command for service of actuating a portion of the vehicle 3. Specifically, in an exemplary case where the mobile device 7 transmits a command to request locking a door of the vehicle 3, the onboard apparatus 5 actuates a door lock actuator of the vehicle 3 to lock the door. In another case where the mobile device 7 transmits a command to request unlocking the door, the onboard apparatus 5 actuates the door lock actuator to unlock the door. Examples of the service of actuating a portion of the vehicle 3 include, in addition to locking and unlocking the door, moving an automatic window and starting an engine.

The examples of the command further include a command for service of notifying, from the onboard apparatus 5, the mobile device 7 of a state of the vehicle 3.

In this case, the onboard apparatus 5 encrypts data of information requested to notify by means of the command, with use of the key stored in the storage device 16 in S320, and transmits the encrypted data to the mobile device 7 by means of the short-range communication device 12. The mobile device 7 receives the data from the onboard apparatus 5 by means of the short-range communication device 22, and decrypts the received data with use of the key stored in the storage device 26 in S220. The mobile device 7 then causes the display device 27 to display contents of the decrypted data. Specifically, in an exemplary case where the mobile device 7 transmits, to the onboard apparatus 5, a command to request notification of malfunction information on the vehicle 3, the onboard apparatus 5 transmits data of the malfunction information to the mobile device 7 and contents of the malfunction information are displayed on the display device 27 of the mobile device 7.

Figure 3:
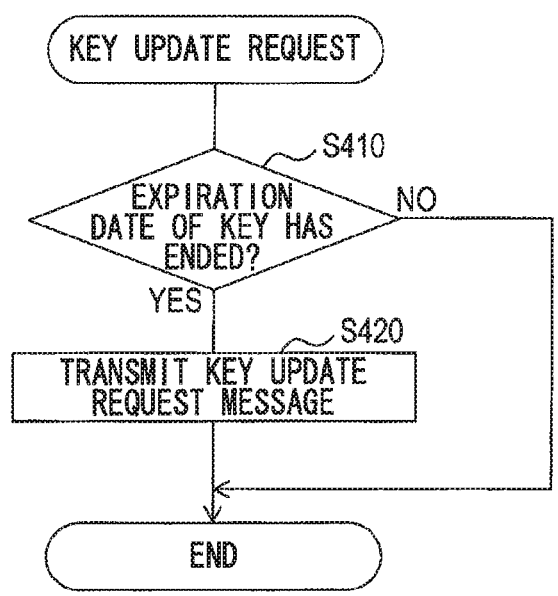
FIG. 3 is a flowchart illustrating key update request processing.

After succeeding in mutual authentication with the mobile device 7 in S340 in FIG. 2 (that is, succeeding in receiving a key), the onboard apparatus 5 executes key update request processing depicted in FIG. 3 at certain time intervals or the like.

As illustrated in FIG. 3, when the onboard apparatus 5 starts the key update request processing, the onboard apparatus 5 determines, in S410, whether or not validity has ended, which is indicated by the validity information stored in the storage device 16 along with the key in S320 in FIG. 2.

The validity information transmitted from the key issuing server 9 to the onboard apparatus 5 in the present embodiment can indicate an elapsed period from issuance of a key as validity of the key.

In S410, the onboard apparatus 5 thus determines whether or not the period indicated by the validity information has elapsed from a time point when the key from the key issuing server 9 is updated and stored in the storage device 16. The onboard apparatus 5 determines that the validity of the key has ended if the onboard apparatus 5 determines that the period has elapsed.

When the onboard apparatus 5 determines that the validity of the key has not yet ended in S410, the key update request processing is completed with no further action. When the onboard apparatus 5 determines that the validity of the key has ended, the flow proceeds to S420.

In S420, the onboard apparatus 5 transmits, to the key issuing server 9, a key update request message to request issuance of a new key. For example, the onboard apparatus 5 encrypts the key update request message with use of the authentication key B, and transmits the encrypted key update request message to the key issuing server 9. The onboard apparatus 5 then completes the key update request processing.

A key update request message corresponds to a key update request. Out of the processing executed by the onboard apparatus 5, the processing in S410 corresponds to processing executed by a determination section whereas the processing in S420 corresponds to processing executed by an update request section.

As Illustrated in FIG. 2, the key issuing server 9 determines whether or not having received a key update request message from the onboard apparatus 5 (S160). Specifically, the key issuing server 9 receives the message from the onboard apparatus 5 and decrypts the received message with use of the authentication key B. When the decrypted message corresponds to a key update request message, the key issuing server 9 determines having received the key update request message from the onboard apparatus 5.

When the key issuing server 9 determines having received the key update request message from the onboard apparatus 5 (YES in S160), the key issuing server 9 repeats the processing from S110 in FIG. 2. In this case, the processing surrounded with the dashed line in FIG. 2 is executed again.

When the key issuing server 9 receives the key update request message from the onboard apparatus 5, the key issuing server 9 generates a new key (S130), issues the new key to the mobile device 7 (S140), and issues, to the onboard apparatus 5, the new key and validity information on the key (S150).

Out of the processing executed by the key issuing server 9, the processing in S140 corresponds to processing executed by a first issuance section, and the processing in S150 corresponds to processing executed by a second issuance section. The processing in steps S130 and S160 corresponds to processing executed by a key update section.

(Effects)

In the vehicle communication system 1 according to the present embodiment, the key issuing server 9 issues, to the onboard apparatus 5, validity information along with a key. Every time validity indicated by the validity information ends, the key issuing server 9 updates a key transmitted to the mobile device 7 and the onboard apparatus 5. This configuration exerts the following effects (1) to (4).

(1) The key issuing server 9 has only to issue a key to the mobile device 7 and the onboard apparatus 5 every time validity indicated by validity information ends. The mobile device 7 and the onboard apparatus 5 thus need to communicate with the key issuing server 9 less frequently.

(2) Since a key used for cryptographic communication by the mobile device 7 and the onboard apparatus 5 is updated every time validity indicated by validity information ends, security of the cryptographic communication can be achieved.

(3) The mobile device 7 and the onboard apparatus 5 have only to store a single cryptographic communication key. There is thus no need to store multiple keys. The mobile device 7 and the onboard apparatus 5 thus need a smaller key storage resource (that is, a memory resource).

(4) The mobile device 7, which may possibly be carried away by a person other than a user of the vehicle 3, does not store key validity information. This configuration prevents a malicious person from manipulating validity information and thus higher security of cryptographic communication can be achieved.

Validity information according to the embodiment described above indicates a period elapsed from issuance of a key as validity of the key. The validity information thus enables accurate control of a length of a period for actual use of an identical key (that is, a key valid period). The validity information issued by the key issuing server 9 may have a fixed value, or a different value every time a key is updated.

First Modification Example

Validity information may alternatively indicate, as validity of a key, how many times particular operation is executed to the vehicle 3 after issuance of the key.

In this case, the onboard apparatus 5 has only to count how many times the particular operation is executed to the vehicle 3 from a time point when the key from the key issuing server 9 is updated and stored in the storage device 16. In S410 in FIG. 3, the onboard apparatus 5 has only to determine whether a count value of the number of times of the particular operation has reached the number of times indicated by the validity information, and determine that the validity of the key has ended when determining that the count value has reached the number of times. Examples of the particular operation include turning on a power switch of the vehicle 3, and opening and closing a door of the vehicle 3.

According to this configuration, it may be possible to change a valid period of the key in accordance with a state of use of the vehicle even though the validity information has a same value. In an exemplary case where validity is one week from issuance of a key, a user, who uses the vehicle only on weekends, needs key update every time the user uses the vehicle, and it is less advantageous to store a key. In contrast, in a case where validity information relates to how many times the power switch of the vehicle 3 is turned on, how many times the door is opened or closed, or the like, an identical key can be used for a certain period.

Second Modification Example

Validity information may still alternatively indicate, as validity of a key, a travel distance of the vehicle 3 after issuance of the key.

In this case, the onboard apparatus 5 has only to measure the travel distance of the vehicle 3 from a time point when the key from the key issuing server 9 is updated and stored in the storage device 16. In S410 in FIG. 3, the onboard apparatus 5 has only to determine whether or not a measured value of the travel distance has reached the travel distance indicated by the validity information, and determine that the validity of the key has ended when determining that the measured value has reached the travel distance. This configuration also exerts the effect similar to that of the first modification example.

Third Modification Example

Validity information may still alternatively indicate, as validity of a key, how many times the vehicle 3 comes into a particular state after issuance of the key.

In this case, the onboard apparatus 5 has only to count how many times the vehicle 3 comes into the particular state from a time point when the key from the key issuing server 9 is updated and stored in the storage device 16. In S410 in FIG. 3, the onboard apparatus 5 has only to determine whether or not a count value of the number of times of the particular state of the vehicle 3 has reached the number of times indicated by the validity information, and determine that the validity of the key has ended when determining that the count value has reached the number of times. This configuration also exerts the effect similar to that of the first modification example.

Examples of the particular state of the vehicle 3 will include a state where the vehicle 3 is supplied with fuel. The fuel of the vehicle 3 serves as a power source of the vehicle 3. Examples of the fuel will thus include fossil fuel such as gasoline or light gas oil, vegetable oil, hydrogen, electricity, as well as a different type of fuel.

The examples of the particular state of the vehicle 3 can include a state where the vehicle 3 has reached a particular place. Examples of the particular place will include a home parking space, a parking lot of a company for which a user works, and any other place.

The examples of the particular state of the vehicle 3 can also include a state where the vehicle 3 has travel speed not less than a predetermined value. Examples of the predetermined value of the travel speed will include 30 km/h, 80 km/h, as well as a different value.

The examples of the particular state of the vehicle 3 can further include a state where the vehicle 3 has engine cooling water temperature not less than a predetermined value. Examples of the predetermined value of the cooling water temperature will include 40° C., 90° C., as well as a different value.

Other Embodiments

The details of the first to third modification examples can be combined appropriately.

Examples of the mobile device 7 include, in addition to a smartphone, an electronic key used for locking and unlocking the door, starting the engine, and the like, of the vehicle 3 and a tablet personal computer.

The mobile device 7 causes a key to be stored preferably in a storage device having an access security function. In a case where the mobile device 7 is a smartphone, the mobile device 7 can be configured to cause a key to be stored in a subscriber identity module (SIM) card. In another case where the mobile device 7 is a tablet personal computer, the mobile device 7 can be configured to cause a key to be stored in a security chip.

The onboard apparatus 5 and the key issuing server 9 may alternatively communicate with each other via the mobile device 7 (functioning as a relaying device) or the like.

Any of the key issuing server 9, the mobile device 7, and the onboard apparatus 5 may communicate wiredly.

The key issuing server 9 may transmit, also to the mobile device 7, validity information along with a key. In this case, the mobile device 7 can disregard and discard the validity information from the key issuing server 9.

The embodiments of the present disclosure have been described above. The present disclosure should not be limited to the above embodiments but can include various modes. The above numerical values are exemplary and may be different.

For example, functions of one of the configuration elements according to any one of the above embodiments may be distributed to multiple configuration elements, or functions of multiple configuration elements may be integrally assigned to a single configuration element. Furthermore, the configuration according to any one of the above embodiments can be removed.

The present disclosure can be embodied in various modes including the vehicle communication system 1, each of the key issuing server 9, the mobile device 7, and the onboard apparatus 5 included in the vehicle communication system 1, a program causing a computer to function as each of these devices, a non-transitory storage medium storing the program, a program product stored in a non-transitory computer-readable storage medium, and a method of managing a key of the vehicle communication system.

It is noted that a flowchart or the processing of the flowchart in the present application includes multiple steps (also referred to as sections), each of which is represented, for instance, as S110. Further, each step can be divided into several sub-steps while several steps can be combined into a single step.

While various embodiments, configurations, and aspects of a vehicle communication system, an onboard apparatus, and a key issuing apparatus according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. A vehicle communication system comprising:
an onboard apparatus that is mounted on a vehicle,
a mobile device that is carried by a user of the vehicle; and
a key issuing apparatus that is provided outside the vehicle and issues a key for cryptographic communication to the mobile device and the onboard apparatus;
wherein:
the mobile device and the onboard apparatus store the key issued by the key issuing apparatus and execute the cryptographic communication with use of the key;
the key issuing apparatus issues, to the onboard apparatus, the key and validity information indicating validity of the key, wherein the validity information indicates, as validity of the key, a travel distance of the vehicle from issuance of the key;
the onboard apparatus includes
a determination section that determines whether the validity indicated by the validity information issued ends by the travel distance of the vehicle from issuance of the key being reached, and
an update request section that transmits, to the key issuing apparatus, a key update request to request issuance of a new key when the determination section determines that the validity ends; and
the key issuing apparatus issues a new key to the mobile device upon receipt of the key update request, and issues, to the onboard apparatus, the new key and the validity information on the new key.

2. The vehicle communication system according to claim 1, wherein:
the validity information further indicates, as validity of the key, an elapsed period from issuance of the key.

3. The vehicle communication system according to claim 1, wherein:
the validity information further indicates, as validity of the key, how many times a particular operation is executed to the vehicle after issuance of the key.

4. The vehicle communication system according to claim 1, wherein:
the validity information further indicates, as validity of the key, how many times the vehicle comes into a particular state after issuance of the key.

5. The vehicle communication system according to claim 3, wherein:
the particular operation is to turn on a power switch of the vehicle.

6. The vehicle communication system according to claim 3, wherein:
the particular operation is to open or close a door of the vehicle.

7. The vehicle communication system according to claim 4, wherein:
the particular state is that the vehicle has engine cooling water temperature equal to or higher than a predetermined value.

8. A vehicle communication system comprising:
an onboard apparatus that is mounted on a vehicle,
a mobile device that is carried by a user of the vehicle; and
a key issuing apparatus that is provided outside the vehicle and issues a key for cryptographic communication to the mobile device and the onboard apparatus;
wherein:
the mobile device and the onboard apparatus store the key issued by the key issuing apparatus and execute the cryptographic communication with use of the key;
the key issuing apparatus issues, to the onboard apparatus, the key and validity information indicating validity of the key, wherein the validity information indicates, as validity of the key, how many times the vehicle comes into a particular state after issuance of the key, and the particular state is where the vehicle is supplied with fuel;
the onboard apparatus includes
a determination section that determines whether the validity indicated by the validity information issued ends by the vehicle coming, for how many times indicated in the validity information, into the particular state after issuance of the key of where the vehicle is supplied with fuel, and
an update request section that transmits, to the key issuing apparatus, a key update request to request issuance of a new key when the determination section determines that the validity ends; and
the key issuing apparatus issues a new key to the mobile device upon receipt of the key update request, and issues, to the onboard apparatus, the new key and the validity information on the new key.

9. The vehicle communication system according to claim 8, wherein:
the validity information further indicates, as validity of the key, an elapsed period from issuance of the key.

10. The vehicle communication system according to claim 8, wherein:
the validity information further indicates, as validity of the key, how many times a particular operation is executed to the vehicle after issuance of the key, wherein
the particular operation is to turn on a power switch of the vehicle, or
the particular operation is to open or close a door of the vehicle.

11. A vehicle communication system comprising:
an onboard apparatus that is mounted on a vehicle,
a mobile device that is carried by a user of the vehicle; and
a key issuing apparatus that is provided outside the vehicle and issues a key for cryptographic communication to the mobile device and the onboard apparatus; wherein:
the mobile device and the onboard apparatus store the key issued by the key issuing apparatus and execute the cryptographic communication with use of the key;
the key issuing apparatus issues, to the onboard apparatus, the key and validity information indicating validity of the key, wherein the validity information indicates, as validity of the key, how many times the vehicle comes into a particular state after issuance of the key, and the particular state is that the vehicle reaches a particular place;
the onboard apparatus includes
a determination section that determines whether the validity indicated by the validity information issued ends by the vehicle coming, for how many times indicated in the validity information, into the particular state after issuance of the key of the vehicle reaching the particular place, and
an update request section that transmits, to the key issuing apparatus, a key update request to request issuance of a new key when the determination section determines that the validity ends; and
the key issuing apparatus issues a new key to the mobile device upon receipt of the key update request, and issues, to the onboard apparatus, the new key and the validity information on the new key.

12. The vehicle communication system according to claim 11, wherein:
the validity information further indicates, as validity of the key, an elapsed period from issuance of the key.

13. The vehicle communication system according to claim 11, wherein:
the validity information further indicates, as validity of the key, how many times a particular operation is executed to the vehicle after issuance of the key, wherein
the particular operation is to turn on a power switch of the vehicle, or
the particular operation is to open or close a door of the vehicle.

14. A vehicle communication system comprising:
an onboard apparatus that is mounted on a vehicle,
a mobile device that is carried by a user of the vehicle; and
a key issuing apparatus that is provided outside the vehicle and issues a key for cryptographic communication to the mobile device and the onboard apparatus; wherein:
the mobile device and the onboard apparatus store the key issued by the key issuing apparatus and execute the cryptographic communication with use of the key;
the key issuing apparatus issues, to the onboard apparatus, the key and validity information indicating validity of the key, wherein the validity information indicates, as validity of the key, how many times the vehicle comes into a particular state after issuance of the key, and the particular state is that the vehicle has travel speed equal to or faster than a predetermined value;
the onboard apparatus includes
a determination section that determines whether the validity indicated by the validity information issued ends by the vehicle coming, for how many times indicated in the validity information, into the particular state after issuance of the key of the vehicle having travel speed equal to or faster than the predetermined value, and
an update request section that transmits, to the key issuing apparatus, a key update request to request issuance of a new key when the determination section determines that the validity ends; and
the key issuing apparatus issues a new key to the mobile device upon receipt of the key update request, and issues, to the onboard apparatus, the new key and the validity information on the new key.

15. The vehicle communication system according to claim 14, wherein:
the validity information further indicates, as validity of the key, an elapsed period from issuance of the key.

16. The vehicle communication system according to claim 14, wherein:
the validity information further indicates, as validity of the key, how many times a particular operation is executed to the vehicle after issuance of the key, wherein
the particular operation is to turn on a power switch of the vehicle, or
the particular operation is to open or close a door of the vehicle.

* * * * *